Jan. 8, 1963　　　　　L. G. SIMJIAN　　　　3,072,237
CURRENCY EXCHANGE APPARATUS
Filed March 17, 1961　　　　　　　　　　　　6 Sheets-Sheet 1

INVENTOR.
LUTHER G. SIMJIAN
BY
AGENT.

Jan. 8, 1963    L. G. SIMJIAN    3,072,237
CURRENCY EXCHANGE APPARATUS
Filed March 17, 1961    6 Sheets-Sheet 2
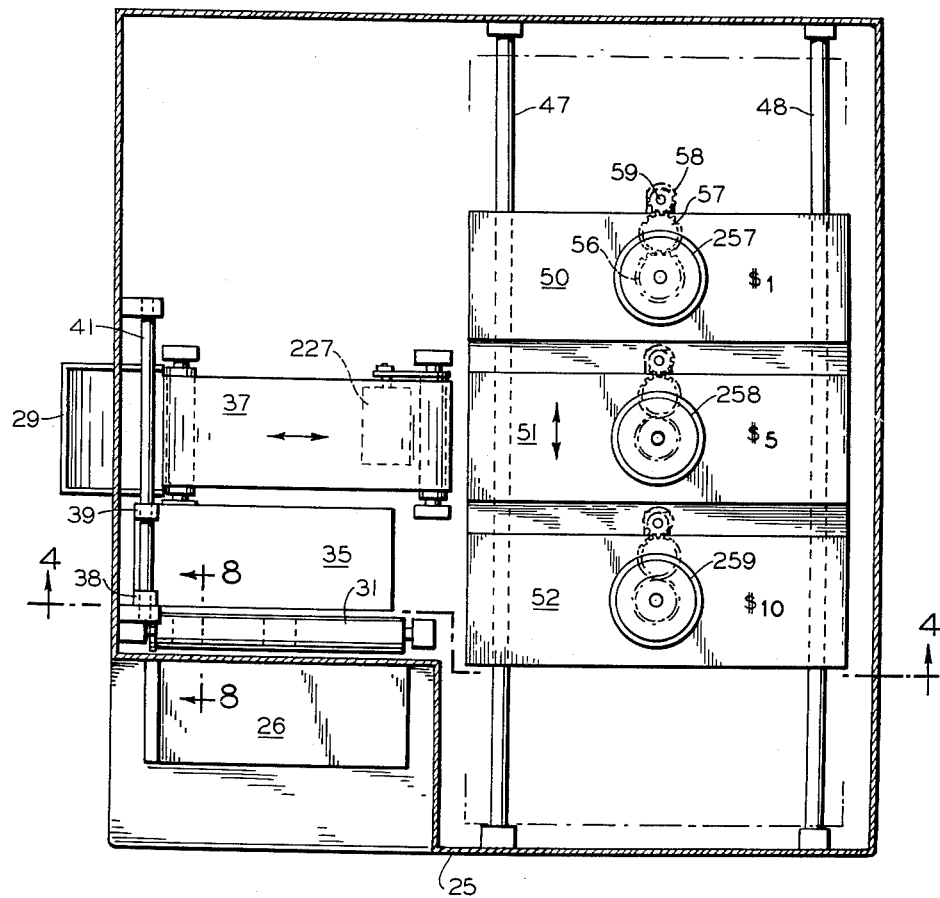
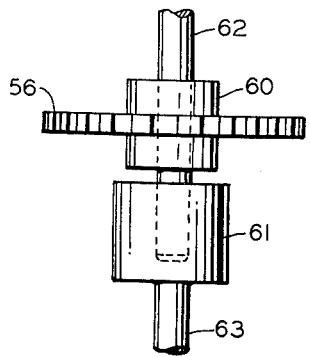
INVENTOR.
LUTHER G. SIMJIAN
BY *Ervin B. Steinberg*
AGENT.

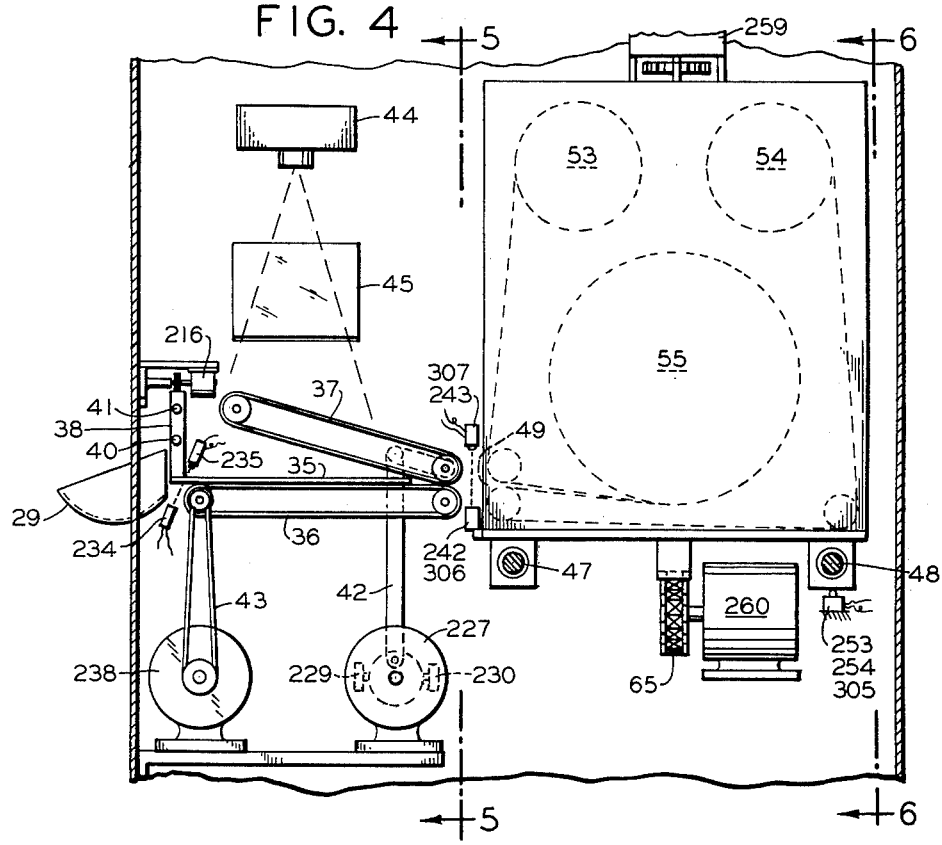
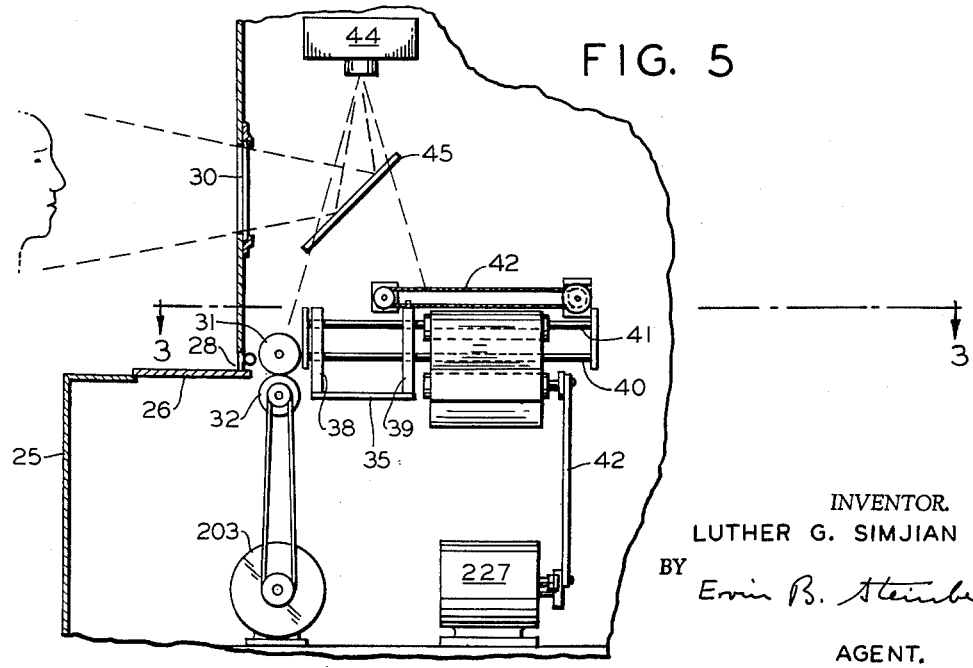

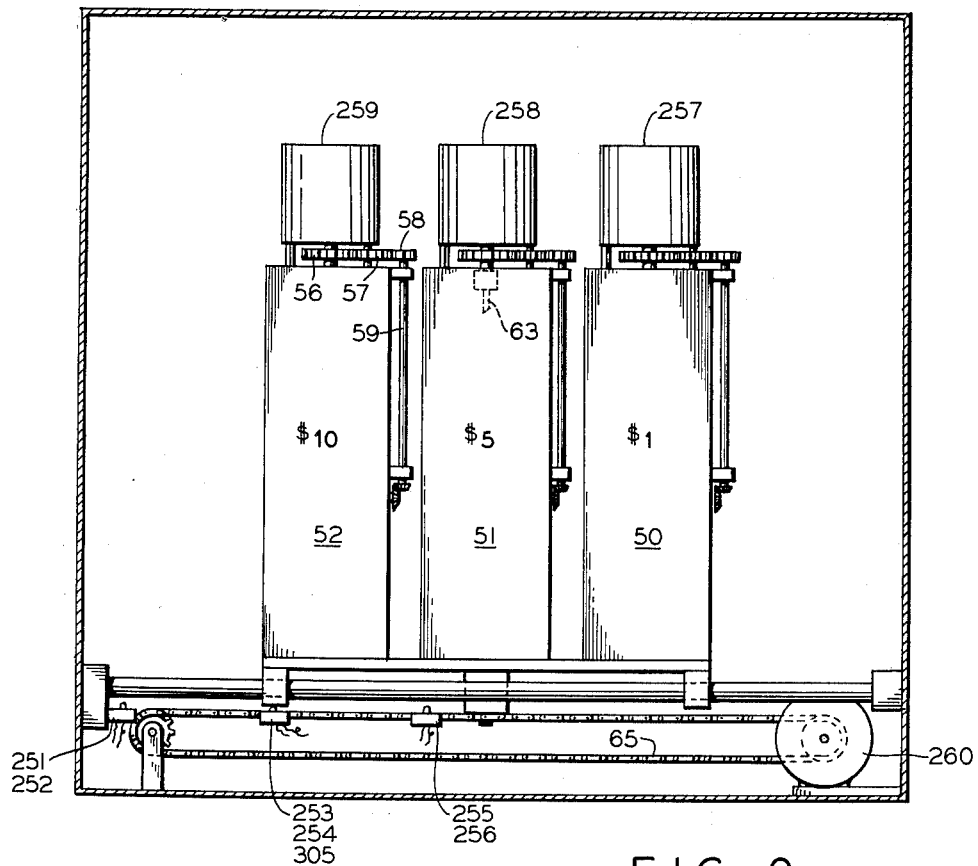
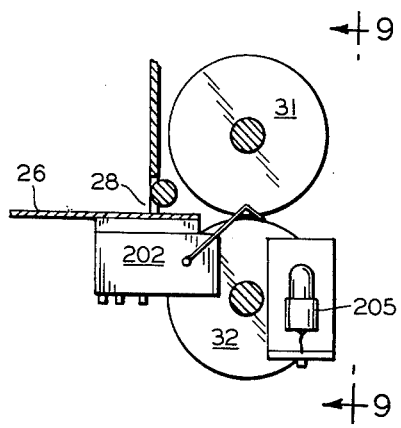
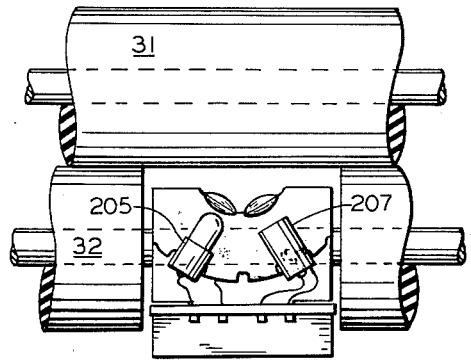

Jan. 8, 1963

L. G. SIMJIAN 3,072,237

CURRENCY EXCHANGE APPARATUS

Filed March 17, 1961

INVENTOR.
LUTHER G. SIMJIAN
BY Ervin B. Steinberg
AGENT.

Jan. 8, 1963  L. G. SIMJIAN  3,072,237
CURRENCY EXCHANGE APPARATUS
Filed March 17, 1961  6 Sheets-Sheet 6

*INVENTOR.*
LUTHER G. SIMJIAN
BY
Ervin B. Steinberg
AGENT.

United States Patent Office 3,072,237
Patented Jan. 8, 1963

3,072,237
CURRENCY EXCHANGE APPARATUS
Luther G. Simjian, Greenwich, Conn., assignor to Universal Match Corporation, Ferguson, Mo., a corporation of Delaware
Filed Mar. 17, 1961, Ser. No. 96,588
11 Claims. (Cl. 194—4)

This invention relates to automated merchandising machines and refers more particularly to a currency exchange apparatus which forms a part of automated merchandising machines.

With the recent advances in the art of automated merchandising systems, vending machines have come into use which accept currency, particularly coins and paper currency, permit the selection and issuance of an article of merchandise, and then return to the patron using the machine credit remaining in the form of coins, paper money, or combination thereof. In devices where only coin money is accepted, in contrast with paper currency or the combination of paper currency and coin money, the issuance of variable amounts of cash presents no problem since in typical machines, such as beverage vending machines, the exchange is accomplished by issuing a varying quantity of five-cent coins. In machines which are designed to accept paper currency and coins, it has been general practice to provide within the machine different packages of money and release a respective package depending upon the value of the article of merchandise selected. Sometimes the cash return is packaged with the goods. In most machines however, paper currency is accepted and stored in a first compartment and the change is issued from a second compartment whereby the type and quantity of merchandise selected and released from the machine governs the type of prepackaged change which is released from the apparatus.

It will be apparent that the provision of a first compartment for accepting currency and one or more compartments for holding varying packages of change currency is afflicted with several shortcomings. One of major disadvantages resides in the fact that the machine must be stocked with a considerable amount of money prior to rendering it operative in order to assure the presence of sufficient change for the total amount of merchandise stocked. The more machines that are installed, the greater the original investment, not only in merchandise but also in initial cash outlay for exchange currency. Additionally, the provision of maintaining accepted currency in a separate compartment renders this money a "frozen asset" until the machine is serviced or restocked.

There has been a great need therefore, to devise an apparatus in which money, particularly paper currency, accepted in exchange for vended merchandise would be available also for issuance as change from the machine. The handling of paper currency in this manner quite obviously presents specialized problems. Not only must paper currency be accurately counted when it is accepted, stored and dispensed, but also the documents must be analyzed and sorted according to their denomination. Furthermore, documents falling outside of pre-established standards, whether counterfeit or of different denomination, or of foreign origin, must be rejected and returned to the person using the apparatus. These specialized and unique problems have been solved in the invention described hereafter by the use of receptacles disclosed by me in a copending application for U.S. Letters Patent, thus achieving an apparatus which is characterized by simplicity and reliability and a device which is ideally suited to operate in conjunction with merchandising machines adapted to dispense articles whose value is in excess of one dollar.

One of the objects of this invention therefore, is the provision of a new and improved apparatus for accepting and dispensing currency.

Another object of this invention is the provision of an apparatus for accepting a deposit of paper currency and wherein the accepted paper currency is available as cash return to the user of the apparatus.

Another object of this invention is the provision of means for accepting paper currency in varying denominations, feeding the currencies to respective receptacles, and dispensing currency from these receptacles as cash return to the depositor.

A further object of this invention is the provision of a self-replenishing currency supply.

A still further object of this invention is the provision of an apparatus which is adapted to accept currency in paper denominations and which includes means for reissuing, if required, the accepted currency. Additionally, the apparatus includes also means for rejecting paper currency falling outside of predetermined limits while providing a documentary record of the rejected currency.

Further and still other objects of this invention will be apparent by reference to the following description when taken in conjunction with the accompanying drawings in which:

FIGURE 3 is a plan view taken, partly in section, along lines 3—3 in FIGURE 5;

FIGURE 4 is an elevational view, partly in section, along lines 4—4 in FIGURE 3;

FIGURE 5 is an elevational view, partly in section, along lines 5—5 in FIGURE 4;

FIGURE 6 is an elevational view along lines 6—6 in FIGURE 4;

FIGURE 7 is a detailed enlarged view, partly in section, of a mechanism associated with the receptacles shown in FIGURES 3, 4 and 6;

FIGURE 8 is an elevational view, partly in section, of the feed rollers forming a part of the apparatus;

FIGURE 9 is a fragmentary view along lines 9—9 in FIGURE 8,

Figure 1:
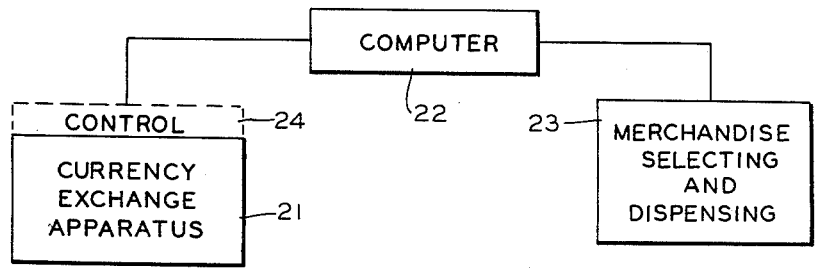
FIGURE 1 is a schematic block diagram of the automated merchandise machine of which the instant currency exchange apparatus forms a part.

Referring now to the figures and FIGURE 1 in particular, numeral 21 refers to a currency exchange apparatus which is associated with a computer 22 and a merchandise selecting and dispensing means 23.

The entire system operates in such a way that a user or purchaser deposits a certain amount of money at the currency exchange apparatus, for instance a $10 bill, and subsequently selects merchandise to be dispensed. A computer keeps track of the accepted money, the value of the merchandise selected, calculates the credit available at any one instant, and finally determines the change to be issued after no further merchandise is to be withdrawn from the system. The computer provides proper signals to the control unit 24 which forms a part of the currency exchange apparatus and which in turn, dispenses the proper amount of change. As has been stated hereinbefore, the currency exchange apparatus is used not only for accepting money but also for returning the credit or cash balance available after the merchandise has been vended. The present invention and description refers only to the currency exchange apparatus and is not concerned with the computer or merchandise selecting and dispensing apparatus. The latter two devices are known in the art in various forms and configurations and can be interconnected readily to the currency exchange apparatus disclosed hereafter.

Figure 2:
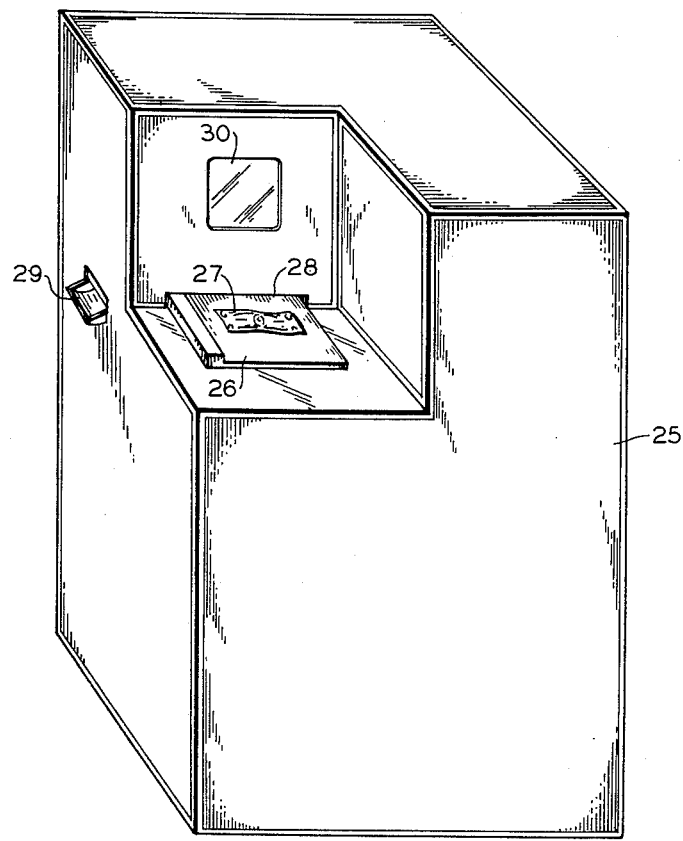
FIGURE 2 is a perspective view of the apparatus showing the front, one side, and the top.

Referring now to FIGURE 2, there is shown an enclosure 25 which houses the currency exchange apparatus portion of the merchandise vending system. There is provided a feeding platform 26 which is adapted to accept paper currency, a $10 bill 27 being shown disposed on the platform, which bill can be inserted into the apparatus by manual feeding through a slot 28 disposed to the rear. Money ejected from the apparatus, such as change or a rejected bill, is issued at a chute 29. A transparent window 30 enables recording means disposed inside the enclosure to record an image of the depositor standing in front of the apparatus.

The merchandise selecting and dispensing controls are not shown as a part of FIGURE 2 but it will be readily understood by those skilled in the art that such controls can be disposed at enclosure 25 and that there may be provided also an indicator (not shown) which continuously displays the credit balance maintained in the machine. Such an indicator is included for instance in the "Mailomat" machine manufactured by Pitney-Bowes, Inc., Stamford, Connecticut, which machine is installed in many lobbies of United States Post Offices.

Referring now to FIGURES 3 through 9 and FIGURES 8 and 9 in particular, there is indicated a mechanism for feeding documents, substantially as shown and disclosed in my copending application for U.S. Letters Patent, Serial No. 93,720, entitled "Feeding Mechanism for Documents or the Like," filed: March 6, 1961. This feeding mechanism comprises two rollers 31 and 32 between which a document is received and which rollers, upon being driven by motor 203, FIGURE 5, feed a document into the enclosure.

Between the rollers there is disposed a set of laterally spaced sensing switches 201 and 202 which when actuated by the leading edge of the document cause operation of motor 203, thereby imparting rotation to the feed rollers. Other circuits also are actuated as will be apparent in conjunction with FIGURES 10 and 11.

Slightly to the rear of feed rollers there is disposed a pair of illuminating means and associated photoelectric sensing means, reference numerals 204, 205, 206 and 207 whose purpose is to analyze the document and hence, to determine the genuineness and/or denomination of the document. If the document does not fall within predetermined characteristics, the document is rejected, being either of improper denomination or possibly a counterfeit. The circuit associated with these photoelectric sensing means invaluing a signal complex has been disclosed in my U.S. Patent No. 2,941,187, issued June 14, 1960, entitled "Apparatus and Method of Determining the Character of a Document." It will be apparent to those skilled in the art that other known document sensing and analyzing means including photoelectric scanning, magnetic sensing means, etc. may be substituted without deviating from the principle of the present invention.

With special reference to FIGURES 3 to 6, a document fed from platform 26 through aperture 28 and feed rollers 31 and 32 reaches a tray 35 which is adapted to slide from its position at just rear of the feed rollers to an alternate position between the rearwardly disposed endless flexible belts 36 and 37. In order to enable this reciprocatory motion, tray 35 is mounted to two upright extensions 38 and 39 which slide longitudinally along two axial shafts 40 and 41. A reversible drive motor 216 mounted stationary with respect to the tray drives a sprocket chain 42 supported around two respective sprockets. The chain is fastened to upright extension 39 to move the tray in response to motion of the chain. As the tray 35 reaches its position between the top portion of endless belt 36 and the bottom portion of belt 37, motor 277, FIGURE 4, is energized to bring via its associated crank mechanism 42 the underside of top belt 37 into engagement with the document resting on the tray. The tray is then restored to its initial position while the document remains clamped between the belts. In the event that the document was "rejected" by the circuit associated with the photoelectric sensing means, i.e., the document did not fall within prescribed characteristics, reversible belt drive motor 238 is energized in such a direction as to cause belt 36, and hence belt 37, to feed the document toward the left in FIGURE 4, and thus, out of the enclosure into chute 29. Simultaneously with the reject signal provided by the document analyzing circuit, image recording means 44 was energized which is adapted to view the document when the latter is disposed on tray 35 and view also via inclined mirror 45 and window 30, the depositor. The recording means therefore, provides documentary evidence of a rejected document and of the depositor in associated identifiable relationship with one another. Such evidence may be used for investigation of persons intent upon defrauding the apparatus or for aiding in the apprehension of counterfeiters.

A document not rejected by the document analyzing circuit reaches per the embodiment shown, one of three currency receptacles, reference numerals 50, 51 and 52 respectively, each receptacle being associated with a respective currency denomination. The receptacles are mounted for reciprocatory motion along a set of parallel shafts 47 and 48. Each receptacle is of a construction substantially as shown and described in my copending application for U.S. Letters Patent, Serial No. 835,765, entitled "Receptacle for Depository Apparatus," filed August 24, 1959, now U.S. Patent No. 2,981,492, dated April 25, 1961.

Each receptacle comprises as indicated in FIGURE 4, a pair of feed rollers 53 and 54 from which there is unwound a respective tape, and both tapes converge in superposed fashion on a roller 55. The rollers can be driven reversibly for either receiving a document between the tapes or for freeing a document from retention between the tapes. When receiving a document for storage, the document enters the receptacle enclosure at aperture 49, is interposed between the tapes as the tapes advance and are wound upon roller 55. When this latter roller is driven in the opposite direction, both tapes are unwound and a document disposed between the tapes is freed from its retention between both tapes and is ejected through aperture 49 of the receptacle toward belts 36 and 37. Thus, each receptacle receives documents serially and dispenses accepted document in reverse serial order.

In order to accomplish the storing or ejection of a document from a respective receptacle, a bidirectional drive motor is associated with each receptacle, reference designation 257, 258 and 259. For receiving a document, each respective motor drives a set of mating gears 56 and 57 as well as an idler gear 58, the latter being connected to a drive shaft 59, see FIGURE 6. From the drive shaft, rotation is transmitted to a set of bevel gears and via differential means to the tape mechanism, substantially as described in the patent identified heretofore.

In order to accommodate bidirectional rotation of the rollers 53, 54 and 55, each receptacle is provided with a clutch mechanism which is interposed in the driving mechanism. As shown in FIGURE 7, the clutch mechanism comprises two commercially available, oppposingly oriented one-way clutches 60 and 61. When the associated receptacle motor drives shaft 62 for storing a deposit, one-way clutch 60 drives gear 56 in the manner indicated heretofore. When the motor is reversed for ejecting a bill, shaft 62 drives clutch 61 which is coupled to shaft 63. Shaft 63 in turn is coupled to the roller drive mechanism. It is possible therefore, to drive the belts associated with the receptacle for either storage or issuance of a respective document.

As shown, the receptacles are designated respectively $1, $5 and $10 to accept or eject a respective currency document.

In order to store a respective currency document or to release a document from one of the receptacles for issuance from the machine, the receptacles are moved in unison along bars 47 and 48 until the desired receptacle is aligned with the interface between belts 36 and 37. As shown in FIGURE 3, the receptacle containing $5 currency bills is aligned with the belts. The sensing or document analyizing means associated with the document feeding mechanism, upon determining the denomination of the document, cause the proper receptacle to become aligned at the position opposite of belts 36 and 37. To effect storage of the document, belts 36 and 37 after restoring tray 35 to its initial position are driven in such a direction as to move the document through opening 49 into the receptacle. Simultaneously, both feed belts in the receptacle are advanced toward roller 55.

Conversely, when a currency document is to be issued upon completion of vending merchandise, the appropriate receptacle as determined by a control circuit is aligned with the belts, and upon driving the roller 55 in the receptacle in an unwinding direction, a document is ejected through aperture 49, fed between belts 36 and 37 and driven forward into chute 29. It will be apparent that when feeding documents, belt 37 must be lowered upon belt 36 by crank mechanism 42.

Alignment of a respective receptacle is achieved by means of reversible drive motor 260 which operates a sprocket chain 65 to which the receptacles are fastened. As the chain moves, the receptacles are successively aligned opposite feed belts 36 and 37, and the position of the receptacles is sensed by switches 251, 252, 253, 254, 255, 256, and 305 which are adapted to engage protrusions of the receptacle structure as will be described in conjunction with FIGURES 10 and 11.

Figure 10:
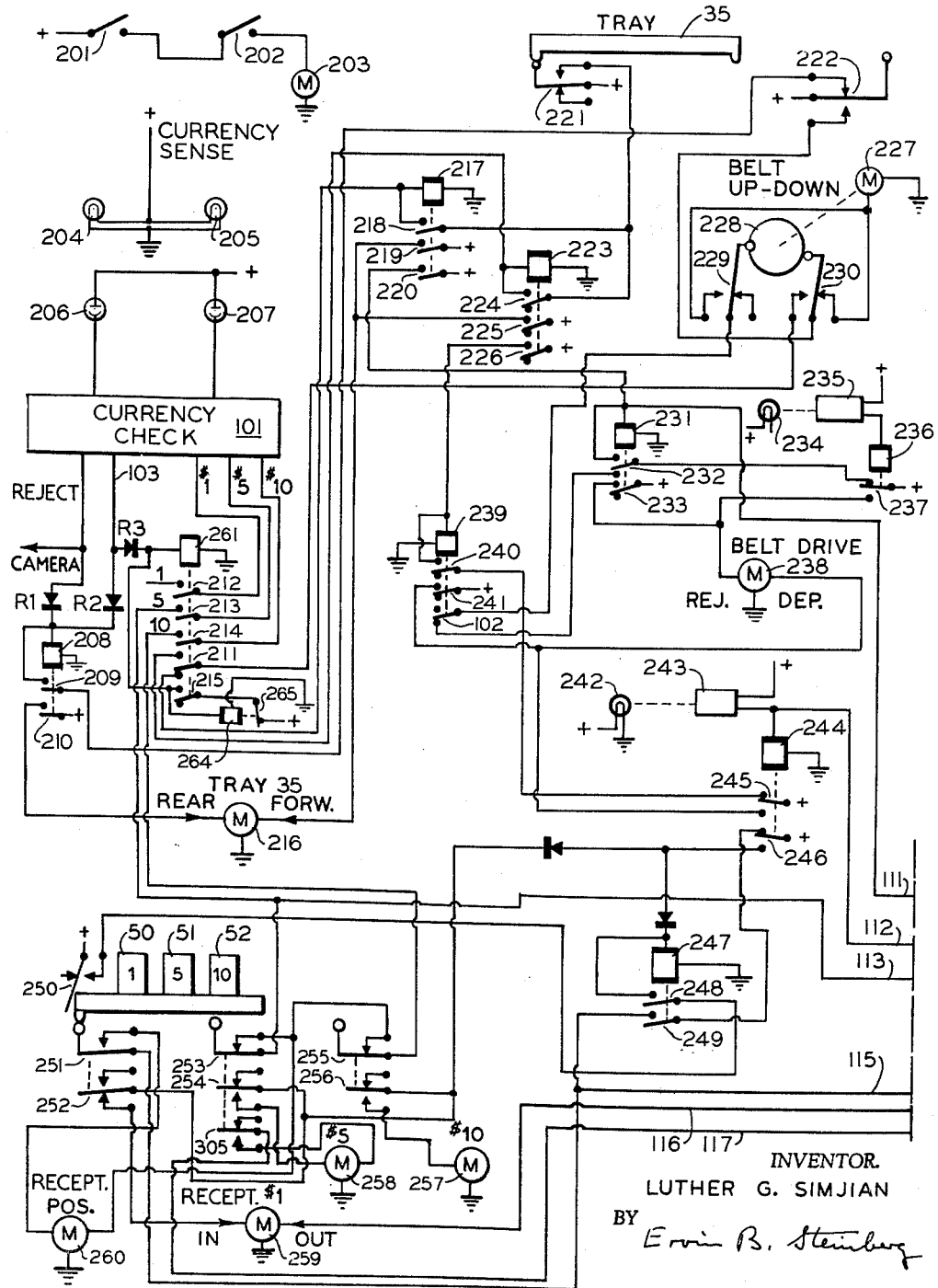
FIGURES 10 and 11 are schematic electrical circuit diagrams of the controls for effecting operation of the apparatus.
Figure 11:
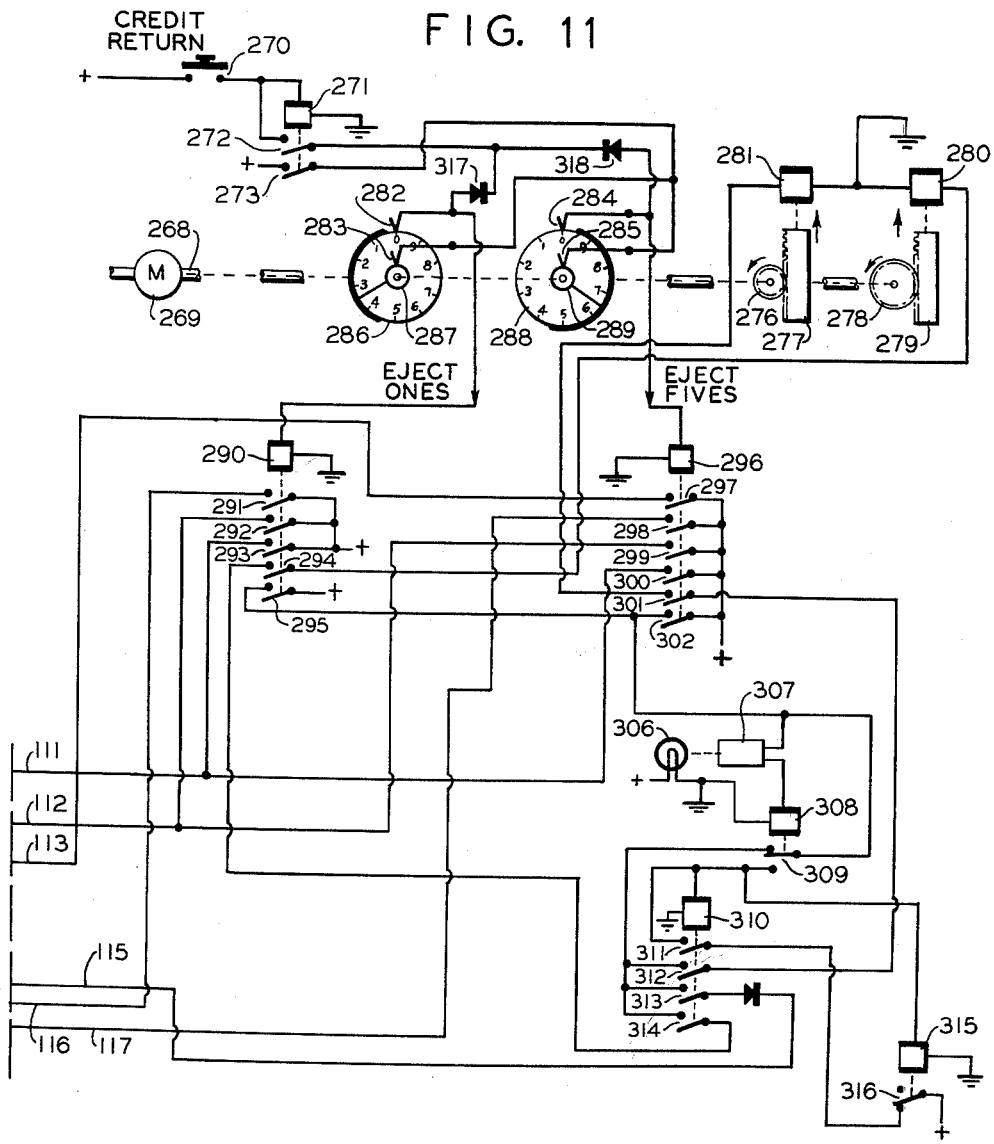
Figure 12:
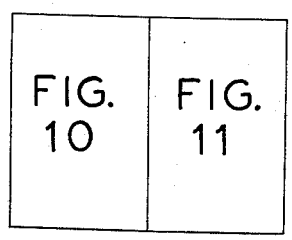
FIGURE 12 is a block diagram showing the relation of FIGURES 10 and 11.

Light and photoelectric sensing means 242, 243, 306 and 307 in front of the receptacle aperture sense when a document is fed in and out of a receptacle, the purpose of these sensing means will be apparent in conjunction with FIGURES 10 and 11.

Although the foregoing description has referred previously to paper currency it will readily be apparent that coin money may be handled, yet the sorting of coin money into respective columns of varying denominations and dispensing thereof is well known and can readily be accomplished by commercial devices presently available on the market.

Summary of Operation, FIGURES 3–9

The coaction of the elements in FIGURES 3 through 9 may be briefly summarized as follows: A document placed on platform 26 and fed through rollers 31 and 32 lands on tray 35. While the document is fed between the rollers, sensing means determine the acceptability of the document and denomination thereof. Tray 35 subsequently is actuated to move between feed belts 36 and 37 and upper feed belt 37 is lowered upon the tray, hence clamping the document. Next, the tray is restored to its starting position. If the document was found to fall outside of prescribed characteristics, a "reject" signal is generated and the belts are driven in such a way as to eject the document toward chute 29 for return to the depositor. As the document was on tray 35, image recording means 44 disposed inside the apparatus were triggered to provide a photograph of the document and of the depositor, thus generating documentary evidence.

If the document was found to be acceptable and its denomination determined, a respective receptacle becomes aligned opposite the position of belts 36 and 37. Motor 238 then is driven in such a direction as to cause the document to be fed through opening 49 into the aligned receptacle, which is the receptacle associated with the denomination of the document. Simultaneously, the feed rollers in the receptacle are driven to store the document between the set of belts. This completes document acceptance.

It will be noted therefore, that a single document is stored at respective intervals of the tape and that such documents are available again for dispensing in single units when the receptacle feed mechanism and tapes are driven in the opposite direction.

After the selected mechandise has been vended and a credit remains, the user of the machine many be entitled to a return of paper currency. In this case, a signal is provided by the computer to the control circuit and in turn one of the receptacles is positioned opposite belts 36 and 37. Rollers 53, 54 and 55 in the associated receptacle are driven to free a respective document from its storage position between the belts, which document then is fed into the space between transport belts 36 and 37. The belts are driven in the "reject" direction to cause the document to be advanced and driven to chute 29. It will be apparent that the respective receptacle drive motors 257, 258 and 259 must be driven by a proper amount in order to cause the release of a single document at a time, which condition is determined by the photoelectric sensing means in front of the receptacle aperture. Further bills may be issued sequentially from the same or other receptacles as determined by the associated computer and control means.

It will be understood that the receptacles when first taken into operation, must contain a certain amount of currency in order to enable initial operation of the machine in the same manner as a cash register in a store requires an initial sum of money in order to provide change for the first few patrons. After a period of time the receptacles can operate with money deposited by the customers.

Several variations of the preferred method of operation described above are readily achieved. When it is desired to provide documentary evidence of every deposit, the image recording means can be actuated each time a document has been fed through the feeding mechanism. Also, by providing belt 37 to be of transparent material or with suitable apertures, a documentary record can be achieved of all currency bills issued from the respective receptacles. The recording of a deposit and exchange article has been described in my previously issued U.S. Patent No. 2,927,515 entitled "Vending Machine Combined With Image Recording Means" dated March 8, 1960.

As has been mentioned earlier, a register indicating the amount of credit available to the user may be provided so that he may be guided in his merchandise selection, especially when multiple article selection is available. The same register or a slaved counter can readily be placed in view of the image recording means, the latter being actuated whenever a change in value occurs, thus providing step-by-step documentary evidence of the transaction through its entire cycle.

Since after the insertion of a document, the apparatus has to go through a prescribed cycle, gate means (not shown) can be provided behind rollers 31 and 32 to prevent entry of a succeeding document until such time that the first document is either accepted and stored in a receptacle or the document is rejected and fed to chute 29.

Description of Schematic Circuit Diagram, FIGURES 10 and 11

When a document is inserted between rollers 31 and 32, switches 201 and 202 (FIGURE 10) are actuated, starting motor 203 to transport the document past the photoelectric sensing means at a fixed rate of speed. Photocells 206 and 207 scan the document, light being supplied by associated lamps 204 and 205.

If the document is found to be not acceptable as determined by the circuit in block 101 a pulse signal generated therein operates both the camera and relay 208, the latter locking up via associated contact 209 and tray position switch 222, while associated contact 210 operates the tray motor 216 to move tray 35 rearward until limit switch 222 is engaged by the tray. This drops out relay 208 and stops motor 216. During this sequence rectifier R2 prevents relay 261 from operating. When switch 222 was operated by the tray moving between belts 36 and 37, a circuit was made through switch 230 for starting the belt lowering motor 227. Cam 228 coupled to the motor stops the motor after one-half revolution, leaving belt 37 in the clamped or downward position. Switch 230, when operated by the cam, creates a circuit via contact 211 of relay 261 to relay 217 which operates and locks in via associated contact 218 and switch 221, while associated contact 219 energizes motor 216 to return tray 35 to its forward position, and associated contact 220 energizes relay 231. Tray 35 is returned to its original position just rear of the feed rollers. Actuation of switch 221 at this point drops out relay 217 which stops motor 216.

When relay 231 operates, associated contact 232 locks the relay in via contact 237 of relay 236, the latter being held in the operated position by photocell 235 which, in turn, is energized by light source 234.

Closing of contact 233 of relay 231 operates the belt drive motor 238 in a direction to move the non-acceptable or rejected document out of the machine into chute 29. When the rejected document passes between light source 234 and photocell 235 (see also FIGURE 4), relay 236 drops out and belt drive motor 238 runs directly from contact 237 of relay 236. This action also caused relay 231 to drop out and when the document has cleared the field of the photocell and moved into chute 29, relay 236 will energize, thus stopping motor 238. Also belt clamp motor 227 will be energized via contact 237 of relay 236, contact 232 of relay 231, contact 102 of relay 239 and switch 229. Cam 228 again limits the motor to one-half revolution leaving belt 37 in raised position.

When an acceptable document is entered in the machine, the sensing phase is the same as previously described, except that a pulse is sent via conductor 103 to energize relays 208 and 261. Rectifier R1 blocks the camera. As in the case of a rejected document, relay 208 again acts to operate motor 216, moving tray 35 to the rear at which point relay 208 drops out while relay 261 remains energized via contact 215, time delay relay 264 and normally closed contact 265. Rectifier R3 acts to block this voltage from relay 208. Operation of tray limit switches 222, 230, motor 227 and cam 228 are also as previously described. When switch 230 is operated by cam 228 and a circuit created via contact 211 of relay 261, voltage is applied to relay 223 since relay 261 is now energized. Relay 223 locks in via associated contact 224 and switch 221, while contact 225 energizes motor 216 which returns tray 35 to its original position. Contact 226 of relay 223 actuates relay 239 which locks in via associated contact 240 and contact 245 on the photocell relay 244. Contact 241 of relay 239 energizes motor 238 to run in a direction so as to deposit the document in one of the storage receptacles.

Photocells 206 and 207 which scan the document coact with the currency denomination responsive circuit 101 to also cause a signal to be applied on one of the lines associated with contact 212, 213 or 214, depending on the amount determined.

Assuming that a five dollar note is supplied, a signal is transmitted via contact 213 of relay 261 to switch 253 and thence to receptacle positioning motor 260 (FIGURE 10) which runs until the proper receptacle is aligned at belts 36 and 37, in this case the $5 receptacle 51, at which point the protrusion (FIGURE 6) on the receptacle carrier actuates limit switch 253, stopping motor 260.

It can be seen that if the receptacles are in their normal position, i.e. lined up with the one dollar receptacle in front of the belts, then no movement is necessary to accommodate a one dollar note, hence there is no circuit through relay 261 for such bills. Similarly, if a signal appears on contact 214 of relay 261, indicating a ten dollar note, the receptacles are shifted until limit switch 255 is actuated, thus aligning the ten dollar receptacle opposite the belts.

In the example of a five dollar note, when the protrusion on the receptacle structure actuates switch 253, switch 254 is also operated. As the belts 36 and 37 move the document toward the receptacle, the light path between lamp 242 and photocell 243 is interrupted and relay 244 is deenergized, thus establishing a circuit via associated contact 246 and contact 254 to motor 258. This motor when energized in this manner drives the rollers and tapes in the five dollar receptacle 51 in a direction to store the document.

When relay 244 deenergizes, associated contact 245 acts to keep the belt drive motor 238 operating until the trailing edge of the document passes the photocells. Contact 246 also operates relay 247 which locks in via associated contact 248 and switch 250. When the document has entered the receptacle, i.e. no longer obstructing photocell 243, relay 244 is energized and associated contact 246 now applies a voltage via contact 249 of relay 247 and switch 251 to the receptacle positioning motor 260 which now drives the receptacles to their initial position. As the receptacles reach this position, limit switch 250 is actuated causing drop out of relay 247 and stopping of motor 260.

*Money Dispensing and Control Means*

As documents are entered into the machine as previously described, in addition to depositing the documents in their proper depository, the computer system causes a register (not shown) to display the total amount entered (credit), and coupled to this register and cooperating with it by means of drive motor 269 (FIGURE 11) is a pair of commutator wheels each divided into ten equal segments. The first wheel 286, which controls the ejection of one dollar bills, has an electrically conductive portion from between 0 and 1 indicia to between 4 and 5. The second wheel 288 which controls the ejection of five dollar bills has a conductive portion from between the 4 and 5 indicia to between 9 and 0. Both wheels 286 and 288 are attached to shaft 268 which can be rotated counterclockwise by pinions 276 and 278 which in turn are driven by racks 277 and 279 respectively. Connection from the shaft 268 to pinions 276 and 278 is made through one-way clutches and a slip clutch which allows the wheels to advance clockwise and enables one or the other pinions to drive the shaft 268 in counterclockwise direction. After money has been deposited in the machine and the register and wheels have advanced to show the credit, merchandise can be selected which action through the computer will cause the register and wheels to subtract the amount of the purchase so that after the last selection, the register attached to shaft 268 shows the amount of money due and the wheels will show the next lowest dollar value, i.e. the amount to be refunded in dollar bills but not coins. The coin change (not shown) can be taken from the register and by means of a commercial change dispenser, such as is used by banks and movie houses, can be returned to the customer.

When the last purchase has been made "credit return" button 270 (FIGURE 11) is depressed which operates relay 271. If five dollars or more is to be returned, then wheel 288 is in such a position that a circuit is established via contact 273 of relay 271, sliding contact 285, commutator ring 289, the commutator segment of wheel 288 connected thereto, sliding contact 284 to contact 272 of relay 271, thereby keeping relay 271 in the energized condition. Sliding contact 284 also operates relay 296 which controls the ejection of a five dollar bill. Closed relay 296 causes contact 297 to apply a signal via conductor 113 to switch 253 (FIGURE 10) and thence to motor 260 which as previously described, causes the receptacles to move until the five dollar receptacle 51 is aligned with the belts.

Contact 298 associated with relay 296 applies via conductor 117 a signal to switch 305 (FIGURE 10) so that when this latter switch is actuated as the receptacle is in position, receptacle motor 258 operates to eject a five dollar bill out onto the belts. Contact 299 of relay 296 applies via conductor 112 a holding voltage to relay 244 (FIGURE 10) for holding the latter energized as the document intercepts the light path to photocell 243. This holding voltage is necessary since relay 244 as previously described is used in the deposit cycle and if it is not kept in an energized position incorrect operation during the eject cycles would result.

Contact 300 of relay 296 via conductor 111 operates relay 231 (FIGURE 10), thus starting the belt drive motor 238 via contact 233 on a "reject" cycle as previously described for ejecting the document from the belts to chute 29. Contact 301 operates solenoid 281 which actuates rack 277, thus turning pinion 276 which, because of its diameter, rotates wheels 286 and 288 in a counterclockwise direction by 180 degrees or 5 numbers.

Contact 302 of relay 296 applies a voltage to photocell 307 and to contact 309 of relay 308. This photocell, light and relay are disposed adjacent to photocell 243 and relay 244 respectively, and contact 302 energizes the former only during an "eject" cycle and not during a "deposit" cycle.

As the money bill on its way from the receptacle passes between lamp 306 and photocell 307 onto the belts, relay 308 drops out and via its contact 309 energizes relay 310 which locks up via associated contact 311 and contact 316 of time delay relay 315. Relay 315 keeps relay 310 energized for a sufficient amount of time to complete its function. As the document leaves the light path, relay 308 is energized again and voltage is applied to the contacts of relay 310. Contact 312 applies a voltage to the aforesaid contact 301 of relay 296 to operate rack actuating solenoid 281. Contact 313 via conductor 115, switch 251 (FIGURE 10) energizes receptacle positioning motor 260 for returning the receptacles to their original position, i.e. the one dollar receptacle being aligned with the belts. Contact 314 has no function at this time. The bill now disposed between the belts is fed to the return chute as previously described in conjunction with the "reject" type of operation.

If the value of bills to be returned were more than $5, say $7—the wheels now being rotated to indicate "7" at the top—then, when the wheels 286 and 288 move counterclockwise by 5 digits, wheel 288 would be clear as far as having a part of its commutator in electrical contact with contact 284, but wheel 286 would now take over since contact 282 would now establish a circuit to its commutator portion. Contact 282 would keep relay 271 energized and relay 290 would now operate (relays 296 and 310 being deenergized). Contacts 292 and 293 have functions as previously described, i.e. they lock up relay 244 and energize relay 231. Contact 291 applies via conductor 116 a voltage to motor 259 which acts to send a one dollar bill out of the one dollar receptacle 50 onto the belts. Contact 295 applies a voltage to photocell 307 and to contact 309 of relay 308, the relay being deenergized when the bill intercepts the light from lamp 306. As contact 309 causes actuation of relay 310 and applies a voltage to the contacts on relay 310 when the bill has passed the photocell light path, all functions are the same as perviously described except that contact 314 now applies its voltage through contact 294 of relay 290 to operate rack solenoid 280 which via rack 279 and pinion 278 rotates both wheels counterclockwise one-tenth of a revolution. As long as the commutator portion of wheel 286 lies in contact with slider 282, dispensing of one dollar bills will continue until the wheels are returned to their respective zero position.

If the cash return is more than one dollar and less than five dollars, only wheel 286 is in the circuit for effecting sequential dispensing of one dollar bills until the zero position of wheel 286 is reached. In this case wheel 288 is not rotated to the extent necessary for actuating the control means governing the issuance of five dollar bills.

While the foregoing description describes the embodiment of an apparatus which can accept a bill up to ten dollars and issues cash in amounts of less than ten dollars, it will readily be apparent to those skilled in the art, that the principles and mechanisms disclosed may be expanded to accommodate larger sums of money, say twenty dollar bills or more.

The machine disclosed therefore, provides for the acceptance of paper currency in varying denominations, includes means for recognizing and sorting currency documents, and includes a plurality of receptacles, each of which can either store or release documents in a manner that only a single document is issued at a time. The sequential issuance of single documents from the receptacles is controlled by wheels whose position, in a manner similar to mechanical adding machines, is responsive to the total amount of money entered in the machine or the credit balance still available after merchandise has been vended. Wheels of this type are usually identified as a "register" in the art of computing machines.

While there has been described a specific embodiment of the present invention and indicated still further, certain alternative constructions or variations, it will readily be understood by those skilled in the art that still other changes may be made therein without deviating from the principle and intent of the present invention which shall be limited only by the scope of the appended claims.

What is claimed is:

1. In an apparatus of the type described, the combination of: document feed means adapted to sequentially accept and feed currency type documents; document sensing means associated with the feed means for determining the denomination of the accepted document; a plurality of movable document receptacles, each receptacle associated with a particular denomination and being operable for selectively accepting and dispensing respective documents; motive means for causing one of the receptacles to be in alignment with said feed means in response to the sensing means having determined the denomination of the document whereby the accepted document is transferred from said feed means to the aligned receptacle; control means for determining the amount of currency to be issued from the apparatus and selecting the receptacle to be aligned with the feed means for issuing a document therefrom, and means causing operation of said receptacle and feed means whereby a currency document is dispensed from the receptacle to the feed means for issuance from the apparatus.

2. In an apparatus of the type described, the combination of: document feed means adapted to accept and feed a currency type document supplied thereto; a movable platform adapted to receive the document after it has been fed by the feed means; belt means adapted to feed the document disposed in proximity to said platform; means for moving the platform toward the belt means and causing the document to be transferred from the platform to the belt means; a plurality of receptacles movable relative to the position of said belt means; each of said receptacles provided with drive means for selectively accepting for deposit a document fed thereto and dispensing respectively a document previously stored therein; sensing means disposed in the apparatus adapted to determine the denomination of the fed document and causing one of the receptacles to be aligned at the belt means whereby the aligned receptacle is assigned the respective document denomination; drive means coupled to said belt means for driving said document from the belt means toward the aligned receptacle and the drive means associated with the receptacle being actuated to cause the document to be fed thereinto; further control means for aligning one of the receptacles with the belt means and causing the aligned receptacle to dispense one of the documents disposed therein whereby the dispensed document reaches the belt means; means for driving the belt means in a direction to cause the belt means to eject from the apparatus the document dispensed from the receptacle; and still further control means for causing the belt means, in response to the operation of said sensing means, to eject a document received thereon from the feed means when the denomination of the document fails to correspond with the denominations assigned to the receptacles.

3. In an apparatus of the type described, the combination of: an enclosure; an aperture in the enclosure for receiving a document having predetermined identifying characteristics which characteristics distinguish the document and classify it with respect to other ones belonging to other classes and having respective other identifying characteristics; document feed means disposed in the enclosure and adapted to accept and feed documents which are received at said aperture; document analyzing means disposed to receive the document fed by said feed means and produicng a signal complex which is responsive to the identifying characteristics of the document; a plurality of document receptacles, each receptacle being associated with the predetermined identifying characteristics of documents receivable by the apparatus and each receptacle being operable for selectively accepting and dispensing respective documents; control means operated responsive to the signal complex from the analyzing means for causing the feed means to feed the accepted document from the analyzing means to one of the receptacles which is associated with the characteristics of the document as determined by the analyzing means; further control means for selecting the class of document to be issued from the apparatus and selecting the receptacle to be operated, and said further control means adapted to cause operation of a selected receptacle whereby a document of the selected class is dispensed therefrom for issuance from the enclosure.

4. In an apparatus of the type described, the combination of: an enclosure; an aperture in the enclosure for receiving a currency type document having printed indicia; document feed means disposed in the enclosure and adapted to accept and feed documents received at said aperture; document analyzing means disposed to receive the document fed by said feed means and producing a signal complex which is responsive to the characteristics of the indicia and hence indicative of the denomination of the document; a plurality of document receptacles, each receptacle being associated with a particular denomination nad being operable for selectively accepting and dispensing respective documents; control means operated responsive to the signal complex from the analyzing means for providing a path from the analyzing means to the receptacle which is associated with the denomination of the document as determined by the analyzing means and causing the feed means to feed the respective document from the analyzing means to said receptacle; further control means for selecting the amount of currency to be issued from the apparatus and selecting the receptacle to be operated, and said further control means adapted to cause operation of the selected receptacle whereby a currency document of the selected denomination is dispensed therefrom for issuance from the enclosure.

5. In an apparatus of the type described, the combination of: an enclosure; an aperture in the enclosure for receiving a document having predetermined identifying characteristics which characteristics distinguish the document and classify it with respect to other ones belonging to other classes and having respective other identifying character-istics; document feed means disposed in the enclosure and adapted to accept and feed documents which are received at said aperture; document analyzing means disposed to receive the document fed by said feed means and producing a signal complex which is responsive to the identifying characteristics of the document; a plurality of document receptacles, each receptacle being associated with the predetermined identifying characteristics of documents receivable by the apparatus and each receptacle being operable for serially accepting, storing and reversely dispensing respective documents; control means adapted to be operated responsive to the signal complex from the analyzing means for causing the feed means to feed the accepted document from the analyzing means to one of the receptacles which is associated with the characteristics of the document as determined by the analyzing means; further control means for selecting the class of document to be issued from the apparatus and selecting the receptacle to be operated, and said further control means causing operation of a selected receptacle whereby a document of the selected class is dispensed therefrom for issuance from the enclosure.

6. In an apparatus of the type described, the combination of: an enclosure; an aperture in the enclosure for receiving documents having predetermined identifying characteristics which characteristics classify the documents and distinguish each document from similar documents associated with other classifications; reversibly operable document feed means disposed in the enclosure and adapted when operated in one direction to accept and feed in series documents which are received at said aperture; document analyzing means disposed to receive the document fed by said feed means and producing a signal complex which is responsive to the predetermined identifying characteristics of the document, a plurality of document receptacles, each receptacle being associated with the predetermined identifying characteristics of documents received by the apparatus and each receptacle being operable for selectively accepting and dispensing respective documents; control means operated responsive to the signal complex from the analyzing means for causing the feed means to feed the accepted document from the analyzing means to one of the receptacles which is associated with the characteristics of the document as determined by the analyzing means; further control means for selecting the document to be issued from the apparatus and selecting the receptacle to be operated; said further control means causing operation of a selected receptacle whereby such document is dispensed therefrom for issuance from the enclosure, and said feed means being actuated and operated in the reverse direction responsive to the signal complex of the analyzing means for ejecting the document from the enclosure when the characteristics of a document as determined by the signal complex is at variance with the predetermined characteristics associated with the respective receptacles.

7. An apparatus as set forth in claim 6 wherein recording means are disposed to record an image of the document ejected from the enclosure, said recording means being actuated responsive to the signal complex from said document analyzing means.

8. An apparatus as set forth in claim 6 wherein recording means are disposed to record an image of the document ejected from the enclosure and of the person operating the apparatus, said recording means being actuated responsive to the signal complex from said document analyzing means.

9. In an apparatus of the type described, the combination of: an enclosure; an aperture in the enclosure for receiving a document having a printed pattern which classifies the document with respect to other classes of documents having other patterns; document feed means disposed in the enclosure and adapted to accept and feed documents which are received at said aperture; document analyzing means disposed to receive the document fed by said feed means and producing a signal complex which is responsive to the position and design of the pattern and hence of the class of the document; a plurality of document receptacles, each receptacle being associated with a class of documents receivable by the apparatus and each receptacle including motive means for accepting serially documents and dispensing such documents in reverse serial order; control means operated responsive to the signal from the analyzing means for causing the feed means to feed the accepted document in response to the signal complex from the analyzing means in serial order to one of the receptacles which is associated with the particular class and said control means causing operation of such motive means; further control means adapted for selecting the class of document to be issued from the apparatus and selecting the receptacle to be operated, and said latter control means when actuated responsive to the operation of said further control means causing operation of a selected receptacle whereby a document of the selected class is dispensed therefrom for issuance from the enclosure.

10. In an apparatus of the type described, the combination of: an enclosure; an aperture in the enclosure for receiving a document having identifying characteristics which characteristics classify the document with respect to other classes of documents having other identifying characteristics; power driven document feed means for gripping the document disposed in the enclosure and adapted to feed documents which are received at said aperture; document analyzing means disposed to receive the document fed by said feed means and producing electrical signals which are responsive to the identifying characteristics of the document; a plurality of document receptacles, each receptacle being associated with a class of documents received by the apparatus and each receptacle including power driven document feed means for selectively accepting and dispensing respective documents; control means operated responsive to the signals from the analyzing means for causing the feed means to feed the accepted document from the analyzing means to one of the receptacles which is associated with the particular class as determined by the characteristics of the document at the analyzing means; further control means for selecting the class of document to be issued from the apparatus and selecting the receptacle to be operated, and said further control means causing operation of the feed means associated with a selected receptacle whereby a document of the selected class is dispensed therefrom for issuance from the enclosure.

11. In an apparatus of the type described, the combination of: an enclosure; an aperture in the enclosure for receiving a printed document having a printed pattern and the position and arrangement of the pattern classifying the document with respect to other classes of documents having similar yet other patterns and arrangements; document feed means disposed in the enclosure and adapted to feed documents which are received at said aperture; document analyzing means disposed to receive the document fed by said feed means and producing a signal complex which is responsive to the pattern and arrangement thereof on the document; a plurality of document receptacles, each receptacle including a pair of flexible belts which are adapted to serially receive and hold therebetween documents and each receptacle being associated also with a class of documents received by the apparatus; reversibly operable drive means for said receptacles to drive said belts in one direction for accepting and storing documents and for driving the belts in the opposite direction to cause discharge of a stored document from the respective receptacle; control means operated responsive to the signal complex from the analyzing means for causing the feed means to feed the accepted document from the analyzing means to one of the receptacles which is associated with the particular class as determined by the analyzing means; said control means causing operation also of said drive means in one direction for accepting and storing the document in the associated receptacle; further control means for selecting the class of document to be issued from the apparatus and selecting the receptacles to be operated, and said further control means causing operation of the drive means associated with a selected receptacle in the opposite direction whereby a document of the selected class is released from the belts for issuance from the enclosure.

References Cited in the file of this patent

UNITED STATES PATENTS

| | | |
|---|---|---|
| 1,081,958 | Grey | Dec. 23, 1913 |
| 1,827,312 | Franks | Oct. 13, 1931 |
| 2,271,397 | McDermott | Jan. 27, 1942 |
| 2,909,107 | Simjian | Oct. 20, 1959 |
| 2,950,799 | Timms | Aug. 30, 1960 |
| 2,995,976 | Weingart | Aug. 17, 1961 |